Figures 1, 2:
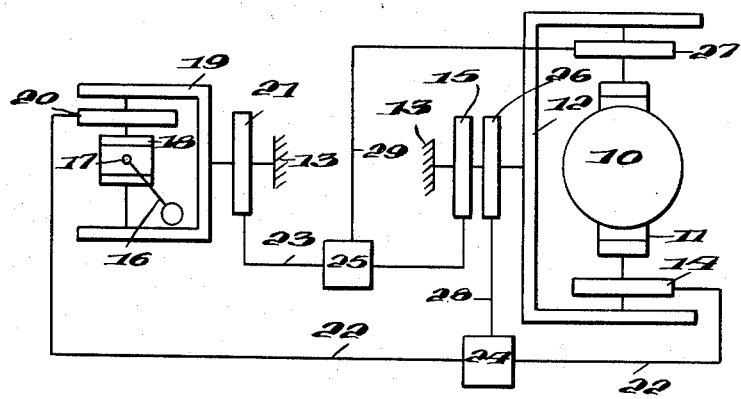

May 17, 1960         CARL-ERIK GRANQVIST         2,936,628
                STABILIZING ARRANGEMENT FOR GYROSCOPES
Filed Nov. 25, 1955                          2 Sheets-Sheet 1

INVENTOR
CARL ERIK GRANQVIST,

BY  *Lawoy and Taylor*

ATTORNEYS

May 17, 1960   CARL-ERIK GRANQVIST   2,936,628
STABILIZING ARRANGEMENT FOR GYROSCOPES
Filed Nov. 25, 1955                           2 Sheets-Sheet 2

INVENTOR
CARL ERIK GRANQVIST,
BY Larson and Taylor
ATTORNEYS

United States Patent Office 2,936,628
Patented May 17, 1960

2,936,628

STABILIZING ARRANGEMENT FOR GYROSCOPES

Carl-Erik Granqvist, Lidingo, Sweden, assignor to Svenska Aktiebolaget Gasaccumulator, Lidingo, Sweden, a corporation of Sweden Application November 25, 1955, Serial No. 549,125

Claims priority, application Sweden December 31, 1954

9 Claims. (Cl. 74—5.47)

The present invention relates to a stabilizing arrangement for gyroscopes by which a rapid and effective stabilizing can take place, either automatically or after manual indication of a need for stabilization. It is known that wrong settings can take place in gyroscopes which are used for navigatory purposes during specific circumstances, especially during strong accelerations or during side-movements of the vessel on which the gyroscope is mounted. Although such movements usually occur in airplane gyroscopes and further in rapidly moving airplanes under advanced flying, the invention may of course be used in all kinds of gyroscopes, even in marine gyroscopes.

The invention is based on the principle that a reliable gyro arrangement should contain both a real gyroscope and also a pendulum. The pendulum is reliable as far as it is in vertical position during level flight, but the pendulum is not possible to use for indication of the vertical direction or the horizontal direction perpendicular thereto when the vessel is made object of forces in the horizontal level caused by an acceleration or by a change of path, for instance a swing in the horizontal level. In such cases the gyroscope should, however, give required reliability, but also the gyroscope is insufficient without the cooperation with a pendulum, because in certain kinds of advanced manoeuvres, the gyroscope will also get out of correct position. Especially is this the case if one of the gimbal shafts accidentally gets into alignment or approximate alignment with the rotation shaft of the gyro rotor, in which case a coupling will be created between these two shafts which may cause a rotation of the gimbal shaft which does not correspond to any movement of the vessel. Such wrong setting of the one gimbal shaft will in its turn by the so-called gyro-coupling introduce an error in the hinges of the other gimbal plane.

For this reason one has preferred that at least in airplanes which are intended for advanced flying a gyroscope is provided which should normally indicate the course and the horizontal line, and also a pendulum, the purpose of which should be after advanced flying to make it possible to rapidly correct the setting of the gyroscope so that the errors introduced during the advanced flying are now done away with, and the gyroscope will again show correct indication. The present invention refers to such a combined system.

In systems of this kind it is important that an automatic gyro correction should occur when such an automatic correction is possible within a reasonable time. This is the case if the gyro error does not exceed a given margin, which will for the following description be assumed for instance to be 5°. If, on the other hand, the gyro error exceeds this margin, then the automatic correction would take too long a time, and for that reason there is a need for an arrangement by which a more rapid correction can be caused on manual indication. One would assume that it would be an advantage if all correction took place as such rapid correction, but this would not be correct. Rapid correction in combination with the unavoidable masses would, as a matter of fact, cause such inertial forces in the system that over control would be unavoidable, and for that reason it is important that the correction should under all circumstances take place as a slower correction movement with higher degree of precision, below referred to as a vernier correction, during the last part of the correction period, for instance within the above-mentioned angle of 5° from the correct position.

Figure 3:
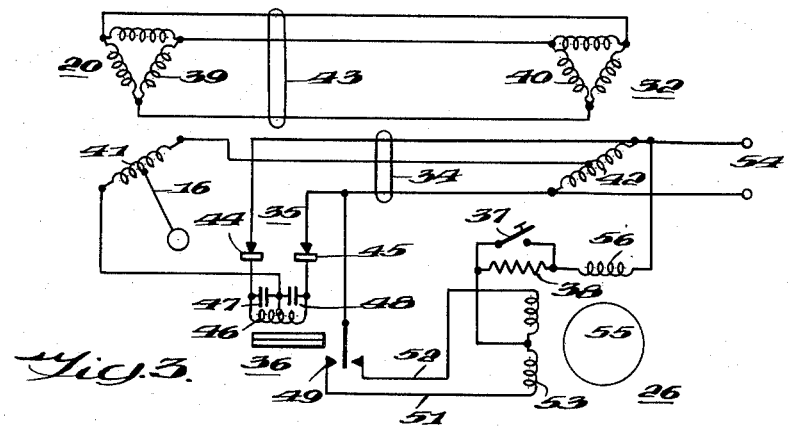
Figure 4:
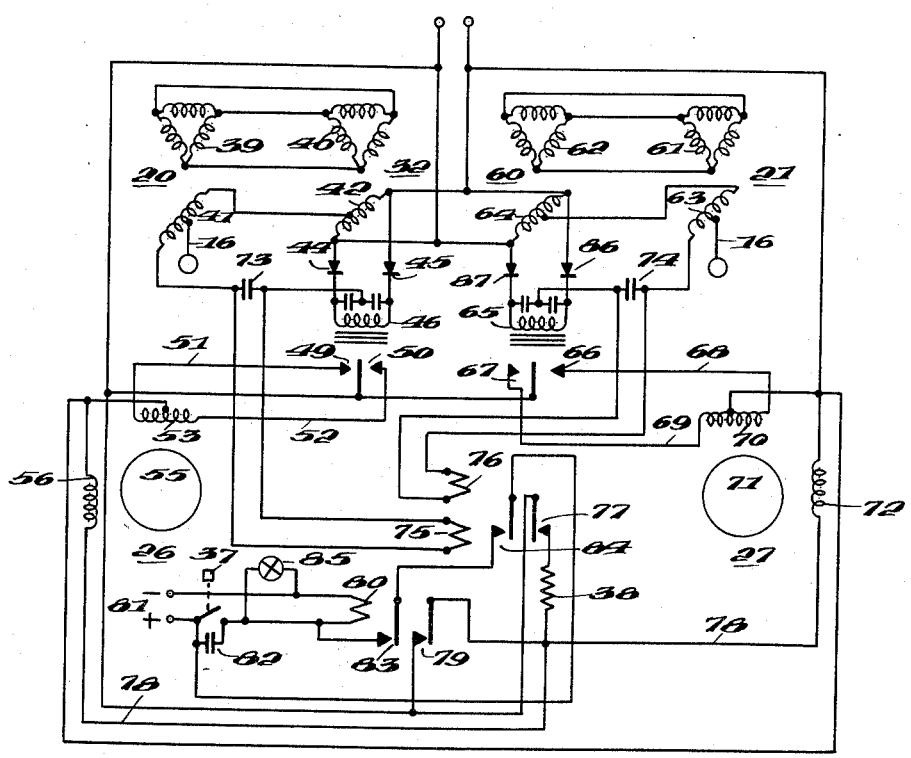

These circumstances will be better understood from a form of execution of the invention referred to below, and also indicated on the attached drawings, in which Fig. 1 shows the known principle for a correction system for gyroscopes with a pendulum, as well as, in a schematical form, the main parts according to the invention, whereas Fig. 2 shows the same system in a more complete principle sketch. Fig. 3 shows a simplified wiring diagram over a given part of the system according to Fig. 2, and Fig. 4 shows a more complete wiring diagram over the same part of the system.

In Fig. 1, the gyroscope rotor is indicated by a 10, said rotor being hinged within an inner gimbal frame 11, said gimbal frame being in its turn hinged within an outer gimbal frame 12. The outer gimbal frame, in its turn, is hinged in the base of the vessel, which is indicated by means of the parts 13. In the axial direction between the inner gimbal frame 11 and the outer gimbal frame 12, a first syngonic element 14 is provided, so that it will indicate deviations from the normal position of the said shaft. A further syngonic element 15 is provided between the outer gimbal frame 12 and the base 13.

The pendulum is indicated by 16. This pendulum is hinged in a body 17, which is also gimbal geared, the inner gimbal frame being indicated by 18, the outer gimbal frame being indicated by 19 and the base as earlier being indicated 13. Between the inner and the outer gimbal frame of the pendulum 16 the syngonic element 20 is connected and between the outer gimbal frame and the base another syngonic element 21 is connected. If now, accordingly, this arrangement is so made that the pendulum is in its vertical position and the gyroscope in its horizontal position during plane flight, and if the two inner gimbal frames have assumed parallel positions and also the two outer gimbal frames have assumed parallel positions, then the syngonic elements 14 and 20 are mutually connected so that during plane flight an error in the gyroscope, indicated by an incorrect position of the syngonic element 14, is corrected by the syngonic element 20, and in the corresponding way the syngonic elements 15 and 21 are mutually connected so that the syngonic element 21 will provide a correction of the setting of the syngonic element 15, if the position of the gyroscope in the space has been changed. The connection between the syngonic elements 14 and 20 is indicated by 22, and the connection between the syngonic elements 15 and 21 is indicated by 23.

In the parts hitherto described in connection with Fig. 1 the system is priorly known. This system, however, does not function well. The syngonic elements have to transfer forces, and further the transfer of force has to take place from the rather easily moveable pendulum to the heavily moveable gyroscope, which always will cause very severe demands on the power of the syngonic elements. Thereby these elements get heavy, big and difficult to mount within the available room. Thereby also difficulties occur statically and dynamically to balance the gyroscope as well as the pendulum, and further the correction will take place much too slowly.

As a first step of development from the standpoint of technics thus described, the present invention therefore indicates that the syngonic elements themselves should be made free from the correction forces and be given exclusively the property of indicating if there is an error or not which needs correction. The indication of this is received by means 24 or 25, respectively, connected into the conduit 22 or 23, resp., and these means in their turn will give a correction advice to a specific motor driven correction means 26 or 27, resp., for the gyroscope. It should be observed that if a noncoincidence should be present between the shafts, which are in the drawing shown as horizontal, and in which the syngonic elements 15 and 21 are connected, then the correction does not take place directly upon the correction element 26 of the horizontal shaft, but the correction pulse is fed to the correction element 27 of the vertical shaft, in order that it should be transferred also to the horizontal shaft by the gyro-coupling. In the corresponding way the correction element 26 of the horizontal shaft is the one which is put in function by a noncoincidence between the syngonic elements 14 and 20, which are connected into the vertical gimbal shafts of the gyroscope and the pendulum, resp. The purpose of this is that one shall obviate force reaction under amplification, which is well known practically unavoidably to cause overcontrol. The conduit from the means 24 to the correction element 26 is indicated by 28 and the conduit from the means 25 to the correction element 27 is indicated by 29.

The arrangement of the syngonic elements 14 and 20, the means 24 and the correction element 26 principally is the same as the arrangement of the syngonic elements 15 and 21, the means 25 and the correction element 27, and therefore only one of these arrangements would need description. This description takes place in connection with Figs. 2 and 3.

In Fig. 2 amongst the parts already described in connection with Fig. 1, the outer gimbal frame 12 of the gyroscope, the syngonic element 14, the pendulum 16, the outer gimbal frame 19 of the pendulum, the syngonic element 20 and the correction element 26 are found. Other parts of Fig. 2 form together the means 24 of Fig. 1.

In order to avoid direct transfer of forces from the syngonic element 20 to the syngonic element 14, the conduit 30 from the syngonic element 14 is carried to a servomotor device for uni-directionary transfer of power in the direction from the syngonic element 14. The servo motor, which is indicated 31, suitably is provided with its own amplifier, so that it does not consume more power from the syngonic element 14 than unavoidably necessary. Thereby the mass of this element can be kept low. The servo motor 31 drives two syngonic elements 32 and 33 applied on its shaft. The syngonic element 32 is connected to the syngonic element 20 by the conduit 22 already mentioned above, which is however, now indicated by 34. The syngonic element 33 is only intended to give an indication from the gyroscope to some indicator means, for instance an artificial horizon. This syngonic element has no more direct connection with the function of this invention.

One will understand from the above that without loading the syngonic element 14 to an essential degree, one will obtain a rather strong correction current through the conduits 34 if a noncoincidence should be present between the syngonic elements 14 and 20. When such unbalanced current is occurring in the conduit 34, a discriminator 35 is reacting to feed a direct current voltage to a relay 36. The relay can either give off the correction pulse to the correction means 26 for rapid correction on manual command, caused by the push button switch 37, or, if this push button switch 37 is not closed, give weaker correction pulse to the correction element 26 over resistor 38. In the latter case a rapid correction will no longer take place but only vernier correction. The arrangement is very schematically drawn, and it shall now be further described under reference to Fig. 3.

In Fig. 3 the syngonic elements are in the usual way consisting of a three-phase wound part and a one-phase wound part. In this case it has been assumed that the three-phase wound part forms the stator 39 and 40, respectively, and that the one-phase wound part forms the rotors 41 and 42, respectively, but of course the circumstances could have been to the contrary, without changing the function of the arrangement. The rotor part 41 belongs to the syngonic element 20 of the pendulum, which is indicated by a pendulum symbol 16. The rotor part 42 belongs to the syngonic element 32. The stators are mutually connected by means of three conductors 43. The rotor windings are arranged to be fed from an available source of one-phase alternating current 54 in such a way that this source of alternating current is directly connected to the outer terminals of the rotor 42, and the center tap point of this rotor is connected with one outer terminal of the rotor 41, whereas the other outer terminal of this rotor is connected with the center tap point on a relay winding 46, across which a pair of rectifiers 44 and 45 are connected with their outer terminals to the rotor 42. If desired, one could include a pair of condensors 47 and 48 for by-passing the rest component of alternating current after the rectification from the relay coil 46.

It is evident from the above that the two rotor windings 41 and 42 are coupled in T-coupling. The voltage is fed directly to the rotor winding 42, which in its turn is inducing a field into the syngonic element 32, and this field induces a voltage into the stator winding which is in the same direction transferred to the syngonic element 20 by means of the stator winding 39 of said syngonic element. The field thus created within the syngonic element 20 induces an alternating current in the rotor winding 41. If now the pendulum is hanging exactly vertically, and the gyroscope is positioned with its shaft vertically, so that its rotation level coincides with the horizontal level, then both of the rotor windings 41 and 42 will be positioned in mutually perpendicular directions, and the voltages existing within them will be displaced out of phase by exactly 90°. The rectifiers 44 and 45 as well as the relay coil 46 form a phase discriminator, which reacts for every change of this balance position to magnetize the relay in one direction when the balance position is changed into its one direction, and into the opposite direction if the change from the balance position between the rotors should take place in the opposite direction.

The relay 46 is polarized. Consequently its moveable contact will be closed against the counter contact 49 at syngonous error in one direction and against the counter contact 50 at syngonic error in the opposite direction. The correction element in this case is formed by a two-phase asynchronous motor with the rotor 55 and the field windings fed from the mains 54, viz. the field winding 56 and the double field winding 53, the two parts of which are wound in mutually different directions. The terminals of the winding 53 are by means of conductors 51 and 52 connected to the discriminator relay contacts 49 and 50, and the center tap is in series with the winding 56 connected with the one terminal of the mains 54. The moveable contact on the discriminator relay is connected with the opposite terminal of the mains. In the conduit 58 from the center tap of the field winding 53 to the winding 56 a resistor 38 is connected, by-passed by push button switch 37.

This arrangement functions in the following way:

It is assumed that a setting error has emanated in the gyroscope during advanced flying. The setting of the pendulum during this advanced flying, of course, is absolutely illusive, and the pilot therefore has no reliable guidance from his instruments. He therefore as quick as possible puts the airplane into straight-out flying, which must not necessarily be level flying, which may possibly be difficult to execute, because the pilot's sense of balance is changed after the advanced flying, and he has no reliable artificial horizon available. It is only essential that no sudden cross-movements may occur, and that the airplane is not the object of an acceleration. The pendulum then will assume the vertical direction, and if the gyroscope has assumed an incorrect position, this incorrect position will be transferred to the servo motor 31, Fig. 2, and from this motor to the syngonic element 32. Thereby the voltage occurring in the rotor 41 will no longer be 90° displaced in phase relative to the voltage in the rotor winding 42, and the discriminator relay will therefore be attracted in the one direction or the other one, dependent upon in what direction the wrong setting of the gyroscope has taken place. The correction element 26 consequently will start rotating in such a direction that the setting error of the gyroscope is decreased. This rotation takes place only slowly, because in the field windings the big resistor 38 is included. Thereby every risk of over control during the course of correction is avoided. If, however, the vernier correction thus occurring should not take place sufficiently rapidly, which may of course especially be the case if the gyro setting error was big, the pilot can press the push button switch 37 and thereby by-pass the resistor 38. The field intensity in the windings 53 and 56 is then increased to such an extent that the correction movement takes place more rapidly, or in other words, the above mentioned rapid correction will occur. Thereby, one has however to observe that the push button switch must be let free in time, because otherwise over control may occur, and one would again lose the time which was gained by the rapid correction.

The switching between rapid correction and vernier correction can take place automatically. Further it is an advantage if one uses both the correction element 26 and the correction element 27 according to Fig. 1. Such a more complete system is shown in Fig. 4.

In Fig. 4 one will again find the syngonic elements 20 and 32 with their stator parts 39 and 40, respectively, and their rotor parts 41 and 42, further the discriminator 46 with its contacts 49 and 50 and the conductors 51 and 52 to the correction element 26 which consists of the rotor 55, with the directly fed field winding 56 and the double wound field winding 53. All of these parts are connected to the correction system, which is in Fig. 1 schematically indicated by 24. However, there are similarly shaped parts for the correction system, which is indicated by 25 in Fig. 1, viz. a syngonic element 21 influenced by the pendulum 16, a syngonic element 60, driven by a servo motor, said elements having stator parts 61 and 62 and rotor parts 63 and 64, further a discriminator 65 with contacts 66 and 67, from which conductors 68, 69 run to the double wound field winding 70 in the correction element 27, the rotor of which is indicated 71 and the perpendicular field winding of which is indicated 72.

The two systems, however, are connected together in the following way:

In each of the conductors which run from the rotors of the syngonic elements 20 and 21 to the center tap of the winding of the discriminators 46 or 65, respectively, a condensor 73 or 74, respectively, is connected for by-passing a possible alternating current, and a tapping is made in parallel to the condensor to one coil 75 or 76, respectively, on a relay, the non-magnetized relay closed contact 77 on this relay is interconnected in series with a resistor 38, corresponding to the resistor in Fig. 2, although in this case connected somewhat differently, and the other terminal of said resistor in its turn is connected in parallel to one terminal of each one of the field windings 56 and 72 over a conductor 78. In parallel to the series coupled group of the contact 77 and the resistor 38, a contact 79 on a relay 80 is connected, and this relay is connected into a circuit which runs from an available source of voltage 81 which could suitably but not necessarily be a direct current source of voltage, said circuit passing the push button switch 37. The last mentioned switch can suitably be by-passed by a condensor 82 for spark extinguishing, but this detail, of course, has no important meaning for the function of the arrangement. The relay 80 is not only provided with the magnetized relay closed contact 79 but also carries the holding contact 83, the circuit of which is running in series with a magnetized relay closed contact 84 on the relay 75—76. Finally, a signal lamp 85 is connected in parallel to the winding 80 so that one will see this lamp illuminated when the relay 80 is attracted.

This arrangement functions in the following way:

The two relay windings 75 and 76 cooperate. If a gyro setting error should be present in the shaft in which the syngonic element 14 is connected, then a direct current potential is formed across the terminals of the condenser 73, and the winding 75 will have a corresponding current. If a gyro setting error should occur in the gimbal frame carrying the syngonic element 15, then in a corresponding way a direct current potential will appear across the terminals of the condenser 74, and the relay winding 76 will carry current. One should however keep in mind that any exertion of force which could provide a setting error in the one gyro gimbal shaft must also be assumed by gyro coupling to have caused a corresponding setting error in the other gyro gimbal shaft, either when the error was occurring or in any case when the position of the vessel was stabilized in such a way that an automatic gyro compensation could occur. The normal situation therefore must be that both of the relay windings 75 and 76 carry currents of the same order of magnitude, if a gyro setting error should be present, but there may be some cases when the currents either are not of the same order of magnitude, or where the one current is zero or approximately zero. On the other hand, due to the coupling direction of the rectifiers 44 and 45 as well as 86 and 87, respectively, the situation may never occur that the currents in the relay windings 75, 76 would counteract each other. The relay 75—76 now is adjusted in such a way that it is attracted for a given current through the relay windings, corresponding to a given gyro setting error, for instance 10°, but will remain attracted for a bigger gyro setting error. On the other hand, the relay will of course again be released when the gyro setting error is decreased, and this release will take place at a setting error which is somewhat smaller than 10°. Usually one is inclined to adjust relays in such a way that they are released at a minimum current which is as close as possible equal to the attraction current, but in this case one makes intentionally the adjustment of the relay in such a way that the release current is essentially less than the attraction current, for instance corresponding to 5° gyro setting error.

It is now assumed that a gyro setting error starts entering incidentally with small angular amounts below 10°. The relay 75—76 has not yet been attracted, and consequently the non-attracted relay closed contact 77 remains closed. The arrangement then will function in essentially the same way as the arrangement according to Fig. 3, which has already been described above, that means the discriminator relays 46 and 65 will indicate which one of the two partial windings of the double wound field winding 53 and 70, respectively, shall carry current, and over the contact 77 current will be fed in series with the resistor 38 to the two remaining field windings 56 and 72, respectively. The motors 26 and 27, therefore, start moving for re-setting the gimbal shafts of the gyro in their correct position in space, guided by the indication from the pendulum, but this re-setting will take place slowly or in other words in the form of vernier correction. The re-setting already will take place during the advanced flying when the indications of the pendulum are perhaps not reliable, but in this case this accidentally introduced setting error will immediately be re-set after the advanced flying is finished. The normal, however, would be that the gyro shafts are made the object of bigger setting errors during the time of the advanced flying, because one has passed such a position that the one or the other of the gyro gimbal shafts accidentally coincided in their direction with the gyro rotor shaft and an auto-coupling occurred. Such big errors cause the attraction of the relay 75—76, and thereby the non-attracted relay closed contact 77 is opened, so that no vernier re-setting can any longer take place.

Now it may of course occur that during an advanced flying, during which accidentally no auto-coupling took place between the gimbal shaft and the rotor shaft and consequently no big errors occurred, the pendulum is swinging out due to centrifugal forces or acceleration forces, thus marking a big error which is not existing in reality. In such a case the consequence will, however, only be that the relay 75—76 is attracted, and when the non-attracted relay closed contact 77 is opened, one is preventing that vernier re-setting shall take place, by which the gimbal shafts of the gyro should be made object of a false correction.

During only weak manoeuvres, the pendulum may of course accidentally make an indication due to an acceleration movement or movement due to changed course, so that a false indication is given, corresponding to less than 10° setting error. Thereby vernier resetting will take place, but the setting error introduced by this last mentioned vernier correction will very rapidly be reset as soon as the manoeuvre in question has ceased, and no essential disadvantage is therefore occurring.

It is now assumed, however, that a real gyro setting error of a greater order of magnitude has occurred, which exceeds the above mentioned amount of 10°. In this case, as already mentioned, the relay 75—76 will be attracted and its non-attracted closed contact 77 is now opened, and no vernier correction will take place. The pilot, however, can now immediately after ceasing the advanced flying during a short interval of time press down the push button switch if such a bigger setting error has occurred. When depressing the switch 37 immediately the marking lamp 85 is ignited by current, running in parallel with the current through the relay winding 80. If there should now be no bigger setting error in the gyroscope, then the relay 75, 76 is also not attracted, and the attracted relay closed contact 84 is opened. The relay 80 then does not get holding current, and the lamp 85 extinguishes immediately after the pilot has re-set the push button switch which is a proof that no bigger setting error is present, which could not normally be fully automatically adjusted by vernier re-setting in the manner already described.

If, however, as assumed above, a setting error of more than 10° has occurred, then the relay 75, 76 has already been attracted when the pilot presses the push button of the switch 37, and the relay 80 accordingly is magnetized. Now, however, this relay will get holding current over its contact 83, and the closed contact 84 on the relay 75, 76, and the relay 80 will therefore remain attracted also after the pilot has re-set the push button, and the lamp 85 also will remain ignited. This is an indication to the pilot that a bigger setting error has occurred, and that the gyroscope is not reliable.

Through the magnetized relay closed contact 79 of the relay 80, the resistor 38 is now by-passed as long as the relay 80 is attracted, and consequently rapid correction will take place. After the setting error has in this way been decreased to 5°, the relay 75—76 is again released, and thereby it opens the holding circuit of the relay 80, which is also released. At its contact 79 thereby the relay 80 opens the by-passing of the resistor 38, and the correction is continued as a vernier correction with the corresponding lower speed of the motors 26 and 27. Thereby one may be sure that no overcontrol shall take place.

The rapid stabilization of the gyroscope suitably could take place with a higher speed, and this could suitably be in the order of magnitude of 60 seconds. The vernier stabilization should take place at a slower speed, and this speed could be in the order of magnitude of 180 seconds. When stabilization speeds are in this way indicated in seconds, this means in the way usual nowadays the total time for stabilization of an error of 90° in space of the setting direction of a gyro shaft. Bigger errors than 90° cannot occur in practice, and one therefore can calculate that with the biggest possible error the rapid stabilization must have reduced this error to 5° in a time of 56 seconds, and that thereafter the vernier stabilization movement has reduced the remaining error in a time of maximum 10 seconds, or totally during a correction time of 66 seconds, which is essentially less than what has hitherto been possible with any known correction arrangements.

The invention, of course, is not limited to one or another of the above described forms of execution, which have been shown in the drawings, but different modifications may occur within the frame of the invention.

What is claimed is:

1. A stabilization device for a gimbal mounted gyroscope guided by the position of gimbal mounted pendulum including syngonic elements connected to the gimbal shafts of the gyroscope and the pendulum, said syngonic elements adapted to cooperate in pairs to correct the position of the gyroscope when the positions of the gyroscope and pendulum deviate, correction elements connected to the gimbal shafts of the gyroscope, and discriminator means connected between connected pairs of said syngonic elements for transmitting signals to said correction elements to indicate a lack of coincidence between the positions of the syngonic elements, one of said syngonic elements of the gyroscope arranged to influence said discriminator means over a servo motor and over a further syngonic element driven by the servo motor, whereby the syngonic element of the gyroscope is not influenced directly by forces from the corresponding syngonic element of the pendulum.

2. Stabilizing arrangement according to claim 1 wherein the syngonic elements, belonging to one gimbal frame of the gyroscope and the pendulum, respectively, are provided to control a correction element for the setting of the other one of the gimbal frames of the gyroscope.

3. Stabilizing arrangement according to claim 1 wherein the discriminator is formed by a device for rectifying the unbalance currents present in connection conduits of the syngonic elements and for influencing a relay for the starting of the correction element.

4. Stabilizing arrangement according to claim 1 and further including means, connected into the circuit to said correction elements for decreasing the force of correction, and switch means for manually putting the first mentioned means out of function for increasing the force of correction.

5. Stabilizing arrangement according to claim 4 and further including a device for measuring the error of setting of the gyroscope to be corrected, said device being connected with said means for increasing the force of correction, whereby said last mentioned means is inoperative at small setting errors of the gyroscope under given angular value.

6. Stabilizing arrangement according to claim 5 wherein said device for measuring the setting error of the gyroscope is formed by a relay connected to the discriminator and so adjusted that it is switched over, when the electric current from the discriminator, indicating the error, is below or above a given value.

7. Stabilizing arrangement according to claim 6 wherein that the relay is so adjusted that when the indication of error increases, the relay is attracted at a higher angular error of the gyroscope but when the indication of error decreases, the relay is released at a smaller angular error of the gyroscope.

8. Stabilizing arrangement according to claim 7 and further including a second relay provided to react when influenced by the switch means, the circuit of said relay including a holding circuit running over a magnetized relay closed contact of said first mentioned relay so that the holding may only occur if the first-named relay is attracted, the second relay thereby being arranged to close a contact in a circuit for correction with high force of correction.

9. Stabilizing arrangement according to claim 9 in which a signal device is connected in parallel with the second relay.

References Cited in the file of this patent
UNITED STATES PATENTS

| | | |
|---|---|---|
| 2,497,614 | Libman | Feb. 14, 1950 |
| 2,531,826 | Reichel | Nov. 28, 1950 |
| 2,533,217 | Braddon | Dec. 12, 1950 |
| 2,589,874 | Seliger | Mar. 18, 1952 |
| 2,597,151 | Konet | May 20, 1952 |